United States Patent
Guo et al.

(10) Patent No.: US 10,289,998 B2
(45) Date of Patent: May 14, 2019

(54) RFID-BASED SMART TERMINAL, BANK CARD AND FINANCIAL MANAGEMENT SYSTEM

(71) Applicant: Huizhou TCL Mobile Communication Co., Ltd., Huizhou, Guangdong (CN)

(72) Inventors: George Guo, Guangdong (CN); Xuelong Ronald Hu, Guangdong (CN); Shiqing Zhao, Guangdong (CN)

(73) Assignee: Huizhou TCL Mobile Communication Co., Ltd., Huizhou, Guangdong (CN)

( * ) Notice: Subject to any disclaimer, the term of this patent is extended or adjusted under 35 U.S.C. 154(b) by 670 days.

(21) Appl. No.: 14/902,091

(22) PCT Filed: Jan. 22, 2015

(86) PCT No.: PCT/CN2015/071330
§ 371 (c)(1),
(2) Date: Dec. 30, 2015

(87) PCT Pub. No.: WO2016/074346
PCT Pub. Date: May 19, 2016

(65) Prior Publication Data
US 2016/0307187 A1    Oct. 20, 2016

(30) Foreign Application Priority Data
Nov. 12, 2014   (CN) .......................... 2014 1 0637882

(51) Int. Cl.
*G06Q 20/34* (2012.01)
*G06K 19/07* (2006.01)
(Continued)

(52) U.S. Cl.
CPC ....... *G06Q 20/341* (2013.01); *G06K 19/0705* (2013.01); *G06K 19/0716* (2013.01);
(Continued)

(58) Field of Classification Search
USPC ....................................... 705/3–44
See application file for complete search history.

(56) References Cited

U.S. PATENT DOCUMENTS 7,896,233 B2 * 3/2011 Phillips .................. G06Q 20/12
                                                              235/379
8,050,651 B2 * 11/2011 Kawabata ........... H03F 3/45179
                                                              455/343.5
(Continued)

FOREIGN PATENT DOCUMENTS

CN      201413553 Y    2/2010
CN      101739583 A    6/2010
(Continued)

*Primary Examiner* — Frantzy Poinvil
(74) *Attorney, Agent, or Firm* — Andrew C. Cheng

(57) ABSTRACT

An RFID-based smart terminal, bank card and financial management system are disclosed. The smart terminal comprises a first RFID antenna, a sensor switch and a processor. The first RFID antenna is configured to receive RFID signals. The sensor switch is configured to, when sensing the approach of an RFID signal source, activate the first RFID antenna directly or through the processor so as to enable RFID function. The smart terminal according to the present disclosure can, when sensing the approach of the RFID signal source, trigger the first RFID antenna a to be activated, and can effectively reduce the power consumption and save energy.

19 Claims, 6 Drawing Sheets

(51) Int. Cl.
  *G06Q 20/32* (2012.01)
  *H04B 5/00* (2006.01)
  *G06K 19/073* (2006.01)

(52) U.S. Cl.
  CPC ... *G06K 19/0723* (2013.01); *G06K 19/07345* (2013.01); *G06Q 20/3278* (2013.01); *G06Q 20/352* (2013.01); *G06Q 20/354* (2013.01); *H04B 5/0025* (2013.01); *H04B 5/0062* (2013.01); *H04B 5/0075* (2013.01); *H04B 5/0093* (2013.01); *Y02B 60/50* (2013.01); *Y02D 70/00* (2018.01)

(56) References Cited

U.S. PATENT DOCUMENTS

| | | | | |
|---|---|---|---|---|
| 8,567,685 | B2* | 10/2013 | Sueoka | G06K 19/0707 235/492 |
| 9,603,090 | B2* | 3/2017 | Khan | G06F 21/35 |
| 2006/0079180 | A1 | 4/2006 | Sinivaara | |
| 2010/0007504 | A1 | 1/2010 | Miyabayashi et al. | |
| 2010/0176948 | A1* | 7/2010 | Garrett | H04B 5/00 340/572.1 |
| 2010/0252622 | A1* | 10/2010 | Bedore | G06K 7/0008 235/380 |
| 2011/0070834 | A1* | 3/2011 | Griffin | G06K 7/0008 455/41.1 |
| 2013/0179340 | A1* | 7/2013 | Alba | G06Q 10/0831 705/41 |
| 2013/0234836 | A1 | 9/2013 | Davis | |
| 2013/0285797 | A1 | 10/2013 | Paulsen et al. | |
| 2014/0081750 | A1* | 3/2014 | Hosp | G06Q 30/0207 705/14.53 |
| 2014/0118147 | A1 | 5/2014 | Davis | |

FOREIGN PATENT DOCUMENTS

| | | |
|---|---|---|
| CN | 201514679 U | 6/2010 |
| CN | 202523081 U | 11/2012 |
| CN | 202534058 U | 11/2012 |
| CN | 103177228 A | 6/2013 |
| CN | 203838756 U | 9/2014 |
| EP | 2369524 A1 | 9/2011 |

\* cited by examiner

RFID-BASED SMART TERMINAL, BANK CARD AND FINANCIAL MANAGEMENT SYSTEM

FIELD OF THE DISCLOSURE

The present disclosure relates to the field of radio frequency (RF) communication, and more particularly, to an RFID-based smart terminal, bank card and financial management system.

BACKGROUND OF THE DISCLOSURE

RFID is an alphabetism for Radio Frequency Identification, generally referred to as an electronic tag. RFID is a technology of using radio frequency to perform non-contact one-way or two-way data transmission between a RF card and a reader. An RFID tag can be used as a unique electronic code to indentify a target object, and can, when compared with a traditional one-dimensional or two-dimensional code, store large amounts of data, with better security, longer service life, etc.

More and more domains are thus beginning to use RFID technology, for example, a bank card embedded with an RFID tag. A traditional bank card generally uses a contact-based or mechanical way such as a magnetic strip read interface and an IC card read interface to implement data read and transmission, with insufficient reliability, stability and read lifetime. To overcome these problems. RFID-embedded bank cards and RFID-smart terminals are emergent accordingly. When a bank card containing the RFID enters the induction zone of the RFID antenna of the smart terminal, RFID communication can be enabled therebetween, The RFID of a current smart terminal, however, would be turned on all the time in order to sense a nearing bank card, causing relatively greater power consumption.

SUMMARY OF THE DISCLOSURE

A main technical problem to be addressed by the present disclosure is to provide an RFID-based smart terminal, bank card and financial management system, which can enable the RFID function of the smart terminal to be turned on when needed and turned off When not needed, and thus can reduce its activation time and the power consumption.

To address the above technical problem, the present disclosure provides an RFID-based financial management system, comprising a smart terminal, a bank card and a banking system. The smart terminal comprises a first RFID antenna, a sensor switch, a processor and a signaling module configured to interact with the banking system through network, which comprises interacting with the banking system based on RFID signals. The bank card comprises a second RFID antenna, an RFID chip and an inductive source, the RFID chip containing the information of the bank card. When the bank card nears the smart terminal, the sensor switch would sense the inductive source and the first RFID antenna would be activated directly or through the processor to receive RFID signals transmitted by the second RFID antenna to enable RFID function.

The inductive source is of magnetic material, and the sensor switch is a Hall switch. When the bank card approaches the smart terminal, the Hall switch would sense the magnetic field produced by the magnetic material, and be automatically closed to activate the first RFID antenna directly or through the processor. When the Hall switch moves away from the smart terminal, the bank card will no longer sense the magnetic field produced by the magnetic material, and be automatically opened to deactivate the first RFID antenna directly or through the processor To address the aforementioned technical problem, the present disclosure provides an RFID-based smart terminal, comprising a first RFID antenna, a sensor switch and a processor, wherein the first RFID antenna is configured to receive RFID signals, the sensor switch is configured to, when sensing the nearing of an RFID-signal source, activate the first RFID antenna directly or through the processor so as to enable RFID function.

The sensor switch is a Hall switch, which would be automatically closed when sensing the magnetic-field signals so as to activate the first RFID antenna directly or through the processor.

The smart terminal may further comprise an electromagnet, and the sensor switch may power on the electromagnet when sensing the nearing of the RFID signal source.

The sensor switch may further be configured to, when sensing the moving away of the RFID signal source, deactivate the first RFID antenna directly or through the processor.

The smart terminal may further comprise a display screen and signaling module, the display screen being configured to, when the first RFID antenna is activated directly or through the processor, enable visualization of the RFID function. via the display screen of the smart terminal, and the signaling module being configured to interact with the banking system via network, which comprises interacting with the banking system based on the RFID signals.

To address the aforementioned technical problem, the present disclosure provides an RFID-based bank card, comprising an RFID chip, a second RFID antenna and an inductive source, wherein the RFID chip contains the information of the bank card, the second RFID antenna is configured to transmit at least. one portion of information of the bank card, and the inductive source is configured to trigger the RFID function of the smart terminal to which the bank card is approaching to be activated.

The inductive source is of magnetic material, and the magnetic material comprises at least one of a magnetic strip, a magnet and a magnetic block.

The inductive source is further configured to trigger the RFID function of the smart terminal from which the bank card is moving away to be deactivated.

Beneficial effects of the present disclosure follow as below: differing from the prior art, the smart terminal of the present disclosure senses via a sensor switch the nearing of an RFID signal source and thus activate the RFID antenna of the smart terminal, and proceeds to receive RFID signals in order to enable RFID function. The prevent disclosure would activate the RFID antenna by the trigger of the source only when the RFID signal source is nearing and the RFID function is needed, so as to prevent the RFID antenna from being activated all the time, thus reducing the activation time of the RFID antenna and effectively reducing the power consumption and saving energy.

DETAILED DESCRIPTION OF THE DISCLOSURE

Figure 1:
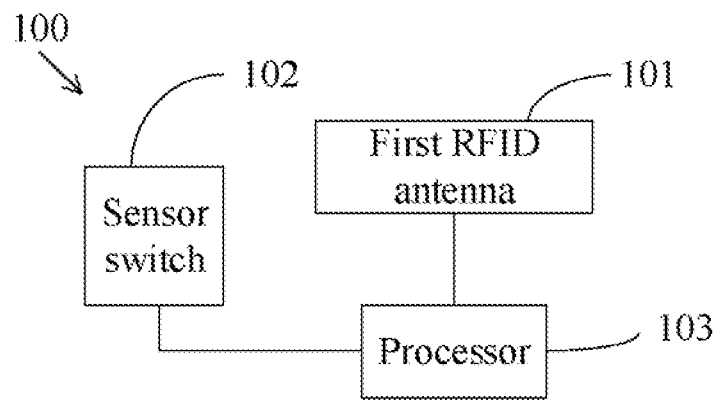
FIG. 1 is a block diagram illustrating a first embodiment of an RFID-based smart terminal according to the present disclosure.

Referring now to FIG. 1, there is shown a block diagram illustrating a first embodiment of an MD-based smart terminal according to the present disclosure. This embodiment provides an RFID-based smart terminal 100, comprising a first RFID antenna 101, a sensor switch 102 and a processor 103 connected respectively to the first RFID antenna 101 and the sensor switch 102.

The first RFID antenna 101 is configured to receive RFID signals.

In this embodiment, the first RFID antenna 101 is attached to the interior of the housing of smart terminal 100, thus enabling the transmission of RFID signals to be uninterrupted and smoother. To make the internal hardware configuration of the smart terminal 100 more optimized, the first RFID antenna 101 can, of course, be arranged at any location in smart terminal 100, on the premise that the first RFID antenna 101 can receive the RFID signals.

Smart terminal 100 serves as a read/write device of RFID tags. The first RFID antenna 101 serves as a communication channel between the RFID tag and the smart terminal 100 for receiving and transmission of RFID signals. When the RFID tag is a passive tag, the first RFID antenna 101 may also produce an electromagnetic field and thus cause the RFID tag located within the electromagnetic field to obtain energy. Hence, the RFID tag may start up an operating circuitry so as to implement data transmission with smart terminal 100.

In this embodiment, the first RFID antenna 101 is a loop antenna. With respect to an antenna made of a same material, turns of the coil of the loop antenna and the current flowing through jointly determine the strength of electromagnetic induction (i.e., strength of the electromagnetic field), which in turn determines the sensing range of the RFID signals and the read/write distance. Therefore, the sensing range as needed in the using process of smart terminal 100 will be considered in conjunction in order to determine the turns of coil of the loop antenna. In this embodiment, the loop antenna is achieved by winding a 0.27 mm-diameter copper wire for 265 turns. In other embodiments, the antenna can also be made into other shapes or by other materials, and the turns of coil can also be selected based on actual requirements.

Sensor switch 102 is configured to, when sensing the nearing of an RFID signal source, activate the first RFID antenna 101 directly or through the processor 103 so as to enable RFID function.

Figure 2A:
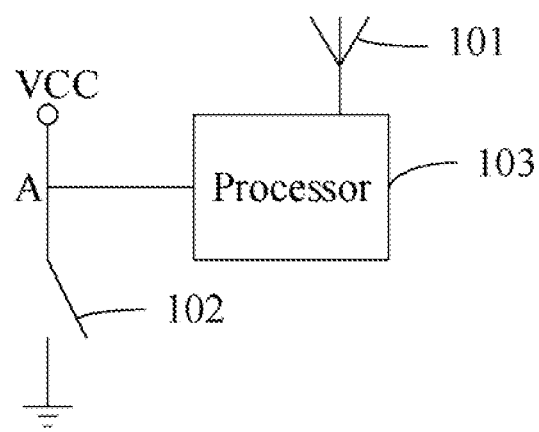
FIG. 2a is a structure diagram illustrating the operation of a first RFID antenna being activated via a processor after a sensor switch is closed according to the first embodiment of the smart terminal.
Figure 2B:
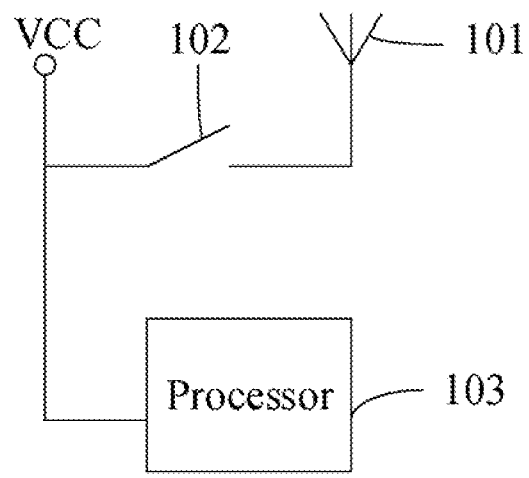
FIG. 2b is a structure diagram illustrating the operation of a first RFID antenna being activated directly after a sensor switch is closed according to the first embodiment of the present disclosure.

Referring, now to FIGS. 2a and 2b for greater detail, FIG. 2a is a structure diagram illustrating the operation of the first RFID antenna being activated via the processor after the sensor switch is closed according to the first embodiment of the smart terminal. FIG. 2b is a structure diagram illustrating the operation of the first RFID antenna being activated directly after the sensor switch is closed according to the first embodiment of the smart terminal. In this embodiment, when the source is approaching the smart terminal 100, the sensor switch 102 can sense the source and thus be closed or opened. For example, the sensor switch 102 may be a Hall switch and may be closed after sensing, a magnetic field, and thus activate the first RFID antenna 101 directly or via the processor 103 so as to enable the RFID function. The sensor switch 102 can also be an infrared sensor switch, an ultrasound sensing switch, etc. In FIG. 2a, when the sensor switch 102 is closed, the processor 103 may detect that the level at point A is changing from a high level into a low level, and thus turn on the current through the first RFID antenna 101 to produce an electromagnetic field to excite the RFID tag of the source, thus effectuating transmission of RFID signals. In FIG. 2b, when the sensor switch 102 is closed, the first RFID antenna 101 is directly powered on so as to produce an electromagnetic field to excite the RFID tag of the source, thus effectuating transmission of RFID signals.

When the RFID signal source is approaching, the smart terminal 100 may turn on its RFID signals. The implementation process, however, will not be limited to the two manners described above, and thus, in other embodiments, can be appropriately adjusted based on actual circuit configuration in the smart terminal 100. For example, the induction circuit containing the sensor switch may be integrated with circuits having other functions in the smart terminal, or be integrated with the first RFID antenna 101 into a single module to be arranged on the mainboard, thus enabling the layout of modules on the mainboard to be more optimized, thus achieving a light and thin design.

When the first RFID antenna 101 has been activated, the smart terminal 100 can then perform transmission of RFID signals, and in turn the read/write of RFID signals via hardware. For example, using a numeric keypad of the smart terminal to enter electrical signals to re-write the information in the RFID signal source, or using software to activate a visual interface for the RFID function, whereby the user can interact with the interface to manage the information in the RFID signal source.

Differing from the prior art, the smart terminal according to the current embodiment activates its RFID antenna when the sensor switch senses the nearing of an RFID signal source, and proceeds to perform transmission of RFID signals to enable RFID function for the smart terminal. The activation of the RFID antenna of the smart terminal, in this embodiment, is triggered by the approach of the RFID signal source. When the RFID signal source is not approaching the smart terminal, the RFID function of the smart terminal (including the RFID antenna) will be deactivated, thus effectively reducing the power consumption and saving energy.

Figure 3:
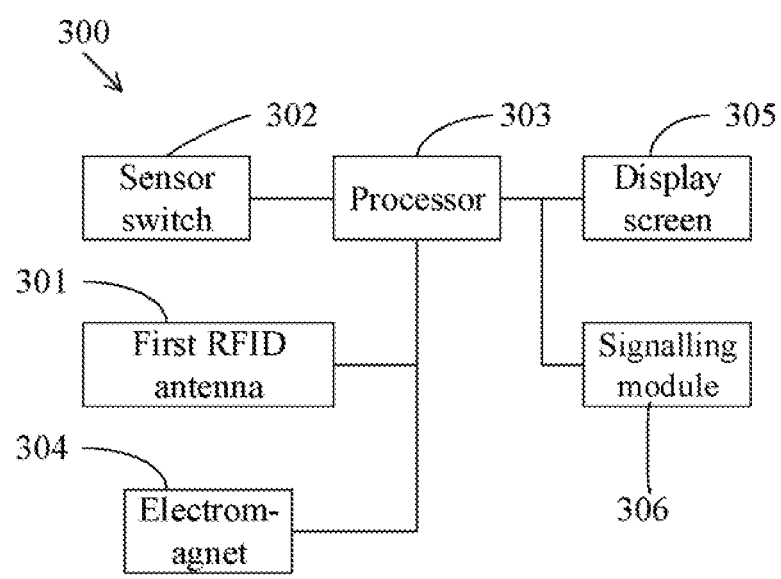
FIG. 3 is a block diagram illustrating a second embodiment of an RFID-based smart terminal according to the present disclosure.

Referring now to FIG. 3, there is shown a block diagram illustrating a second embodiment of an RFID-based smart terminal according to the present disclosure. This embodiment provides an RFID-based smart terminal 300, comprising a first RFID antenna 301, a sensor switch 302, a processor 303, an electromagnet 304, a display screen 305 and a signaling module 306.

The first RFID antenna 301 is configured to receive RFID signals. The sensor switch 302 is configured to, when sensing the approach of an RFID signal source, activate the first RFD antenna 301 directly or through the processor 303 to enable RFID function. The sensor switch 302, in this embodiment, is a Hall switch, which would he automatically closed when sensing magnetic-field signals of the source in order to turn on the first RFID antenna 301 directly or through the processor 303.

The detailed structure of the first RFID antenna 301, the sensor switch 302 and the processor 303 and the implementation process are analogous to those of the first embodiment, and thus won't be went into details herein. More specifically, the induction zone generated by the first RFID antenna 301 is over the back housing of the smart terminal 300.

Meanwhile, the sensor switch 302 may, when sensing the approach of the RFID signal source, power on the electromagnet 304. The sensor switch 302 is further configured to, when sensing the moving away of the RFID signal source, deactivate the first RFID antenna 301 directly or through the processor 303.

In this embodiment, the RFID signal source can produce a magnetic field, and the sensor switch 302 (i.e., the Hall switch) would he closed when the source is nearing, and thus switch on the current in the coil of the electromagnet 304. Based on the principle of electromagnetic induction, the electromagnet 304 will produce magnetism and can thus attract the RPM signal source containing magnetic material. When the Hall switch is opened, the current in the coil of the electromagnet 304 will be switched off, and the electromagnet 304 will lose its magnetism, and thus no longer attract the RFID signal source, In the prior art, however, when using a smart terminal to sense the RFID signal source, the source need assistance of external forces to be maintained within the induction zone of the smart terminal, causing complexity and inconvenience to the user. While in the current embodiment, the source can be attracted directly onto the smart terminal so as to realize the RFID function, which is far more convenient.

In this current embodiment, the switch-on of the Hall switch is triggered by the RFID signal source, and the switch-off of the Hall switch is also triggered by the RFID signal source. When operations with the RFID function are finished, the RFID signal source would be removed, hence, the Hall switch would be opened and the current through the electromagnet 304 would be switched off so that the electromagnet 304 will no longer attract the RFID signal source hi this case, the magnetic field produced by the electromagnet 304 in the smart terminal 300 is not sufficient enough to influence the switch-on and off of the Hall switch.

Figure 4A:
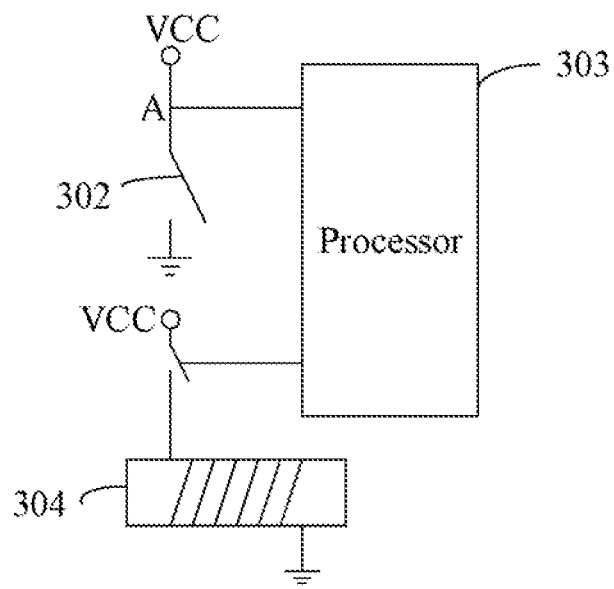
FIG. 4a is a structure diagram illustrating the operation of an electromagnet being powered on via a processor after a sensor switch is closed according to the second embodiment of the smart terminal.
Figure 4B:
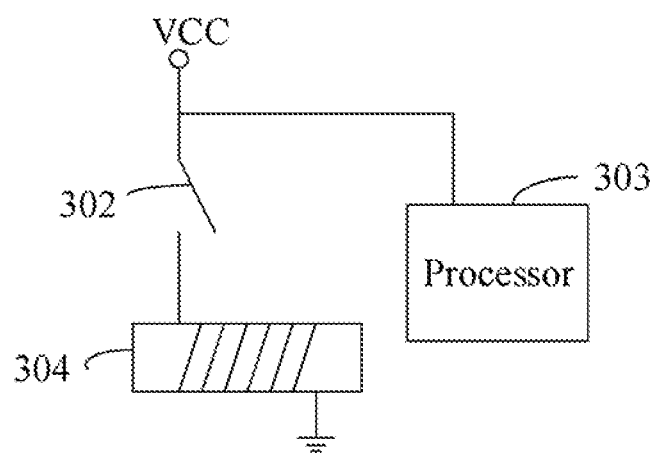
FIG. 4b is a structure diagram illustrating the operation of an electromagnet being powered on directly after a sensor switch is closed according to the second embodiment of the present disclosure.

Referring, now to FIGS. 4a and 4b for greater detail. FIG. 4a is a structure diagram illustrating the operation of the electromagnet being powered on via the processor after the sensor switch is closed according to the second embodiment of the smart terminal. FIG. 4b is a structure diagram illustrating the operation of the electromagnet being powered on directly after the sensor switch is closed according to the second embodiment of the smart terminal. In FIG. 4a, when the sensor switch 302 is closed, the processor 303 may detect that the level at the point A is changing from a high level into a low level, and thus turn on the power switch K of the electromagnet 304 to enable the electromagnet with magnetism. When operations with the RFID function are finished, the RFID signal source will be removed and thus the sensor switch 302 would no longer be located within the magnetic field. Additionally, since the magnetic field produced by the electromagnet 304 is not sufficient enough to influence the sensor switch 302, the sensor switch 302 would be opened, and the processor 303 may detect that the level at point A is changing from a low level into a high level, namely, the power switch K of the electromagnet 304 is turned off, and thus the electromagnet 304 would lose its magnetism.

Figure 5:
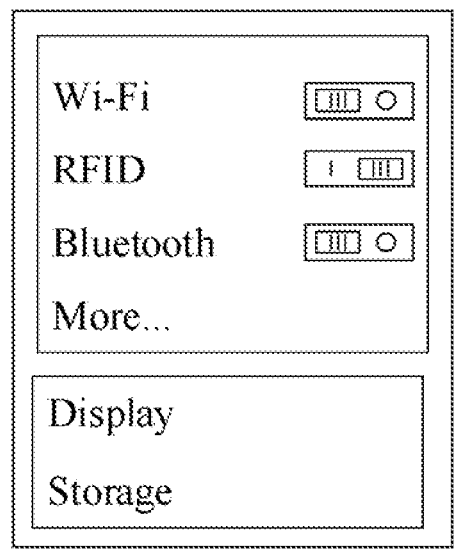
FIG. 5 is a schematic diagram of virtual buttons for activating RFID function in the smart terminal.

In other embodiments, the switch-on and off of the Hall switch can also be controlled by the smart terminal 300. Referring now to FIG. 5 for greater detail, there is shown a schematic diagram of virtual buttons for activating the RFID function in the smart terminal. The user may slide an RI ID switch button to turn on the RFID function, where the RFID switch button may be a virtual button and may also be a physical button. The processor 303 may then turn on the RFID function and concurrently control the Hall switch to be closed, enabling the electromagnet to attract the RFID signal source, and, when associated operations are finished, turn off the MID function and concurrently control the Hall switch to be opened so that the current flowing through the electromagnet 304 would be cut off and thus the electromagnet 304 would lose its magnetism. In another embodiment, the electromagnet 304 can be replaced by permanent magnetic material, in which case the permanent magnetic material can directly attract the RFID signal source without the trigger of the sensor switch 302.

The display screen 305 is configured to enable visualization of functions of the smart terminal 300. Specifically, when the first RFID antenna 301 is turned on directly or through the processor 303, the smart terminal 300 can enable the visualization of the MAD function relying on the display screen 305.

The smart terminal 300 can be a POS machine, a mobile phone, a tablet computer, a public inquiry machine, and the like. Different smart terminals have different functions. The display screen of the POS machine is relatively smaller, and is thus used to display operation tips or specific data. The mobile phone can display a specific administration menu, and can, with the current extensive application of a touch-screen, enable human-computer interaction via the display screen to perform visualized management to implement more functionalities, even personalized and customized functions. The display screen of the public inquiry machine is generally used to display generic functions.

Figure 6:
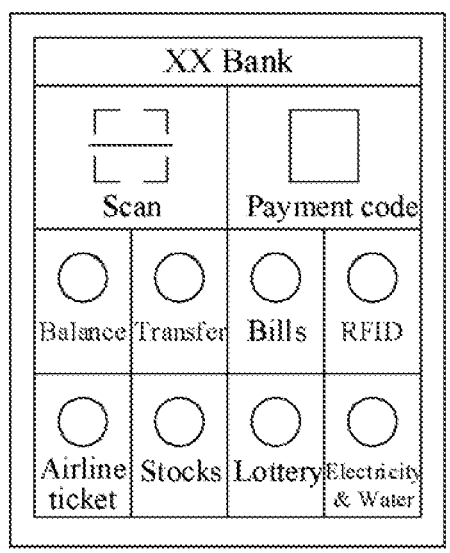
FIG. 6 is a schematic diagram illustrating an interface for enabling RFID function on a display screen.

In this embodiment, the smart terminal 300 is a mobile phone terminal, and the display screen 305 is a touch-screen. The processor 303 of the smart terminal 300 is the main hardware for realizing the RFID function. The display screen 305 can be an input device and a display device as well. The user can send a command via the display screen 305, and subsequently implement the RFID function via the processor 303, and can also view specific RFID information and operation information on the display screen 305. Referring now to FIG. 6 for greater detail, there is shown an interface for visualizing the RFID function on the display screen. FIG. 6 shows an example of a financial management interface, namely, the RFID signal source is a bank card, and the user can check the account information of the bank card through this interface, and thus attaining functions of inquiry, remote payment, transfer of account, and so on, and perform read/write operations on the bank card via transmission of RFID signals.

The signaling module 306 is configured to interact with the banking system via network, comprising interacting with the banking system based on RFID signals.

The signaling module 306 is mainly configured to connect to a wired or wireless network, enabling the smart terminal 300 to interact with the banking system via the network, Meanwhile, the interface for RFD function on the display screen 305 of the smart terminal 300 can be utilized to perform visualized operations so as to implement operations of inquiry, remote payment, transfer of account, etc. The network mentioned herein comprises a 2G/3G/4G network or a WiFi network, With regards to a stationary public inquiry machine and the like smart terminals, wired network can also be applied.

In this embodiment, if the RFID signal source is a bank card, then the specific process of the interaction between the smart terminal 300 and the banking system based on RFID signals comprises the following:

Implementing data transmission by the smart terminal 300 with the bank card via the first RFID antenna 301;

Transmitting by the smart terminal 300 the RFID signals (for example, account information) received from the bank card to the banking system directly or after processing.

The account in the banking system contains the information of the corresponding RFID signals. Thus, the smart terminal 300 can implement remote banking operations on the corresponding account based on the RFID signals.

Differing from the prior art, the smart terminal according to the current embodiment triggers the RFID antenna of the smart terminal to be activated by the trigger of the nearing of an RFID signal source after the sensor switch senses the approach of the RFID signal source. When the RFID signal source is not nearing the smart terminal, the RFID function of the smart terminal (including the RFID antenna) would be deactivated, thus effectively reducing the power consumption and saving energy. When the RFID antenna is activated, the RFID signals can be transmitted so as to enable the RFID function of the smart terminal. The electromagnet in the smart terminal would be powered on concurrently when the RFID antenna is activated, causing the electromagnet to produce magnetism and thus attract the RFID signal source which is also magnetic, this making the operations to be more convenient. Furthermore, a display screen and a signaling module can be configured in the smart terminal to enabling visualization of the RFID function and interaction with the banking system by connecting to a network.

Figure 7:
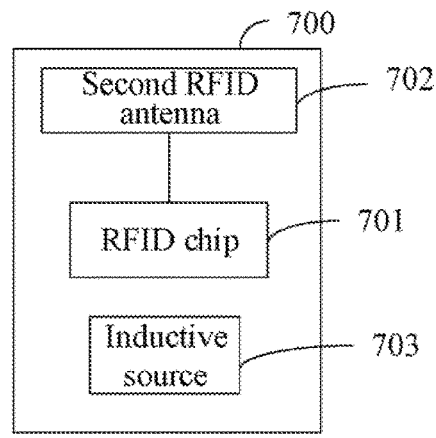
FIG. 7 is a block diagram illustrating a first embodiment of an RFID-based bank card according to the present disclosure.

Referring now to FIG. 7, there is shown a block diagram illustrating a first embodiment of an RFID-based bank card according to the present disclosure. This embodiment provides an RFID-based bankcard 700, which comprises an RFID chip 701, a second RFID antenna 702 and an inductive source 703.

The RFID chip 701 contains the information of the bankcard 700.

The RFID chip 701 contains the account information of the bankcard 700. Since the capacity of the RFID chip 701 is relatively big and is readable and writable, other information can also be stored therein, for example, balance information, holder's name and holder's contacts of the corresponding account. The user can selectively store the relevant, information based on actual needs.

The second RFID antenna 702 is configured to transmit at least a portion of the information in the bank card such as, for example, the account information.

The structure and function of the second RFID antenna 702 are analogous to those of the first RFID antenna in the first embodiment. That being said, what distinguishes them is that the first RFID antenna is disposed in the smart terminal, and thus can be supplied with power by the smart terminal for communication, while the second RFID antenna 702 is arranged in the bankcard 700 which is passive in this embodiment. Thus, one function of the second RFID antenna 702 is to receive the electromagnetic waves produced by the first RFID antenna to generate and transmit electrical energy to the RFID chip 701 in the bank card 700. The location where the second RFID antenna 702 is arranged is such that its induction zone is at the center of the bankcard 700.

The inductive source 703 is configured to trigger the RFID function of the smart terminal to which the bankcard 700 is approaching to be activated, and to further trigger the RFID function of the smart terminal from which the bankcard 700 is moving away to be deactivated.

The smart terminal can activate its RFID function when sensing the nearing of the inductive source 703, and deactivate its RFID function when sensing the moving away of the inductive source 703. in this embodiment, the inductive source 703 is of magnetic material which can produce a certain magnitude of magnetic field which can trigger the Hall switch to be closed. The Hall switch can be disposed in the RFID function-activation circuit of the smart terminal. Hence, the inductive source 703 can trigger the RFID function of the smart terminal to be activated. When the inductive source 703 is removed from the smart terminal, the Hall switch will no longer be located within the magnetic field, causing the RFID function to be deactivated.

The magnetic material comprises at least one of a magnetic strip, a magnet or a magnetic block. It can be concluded from the above description that, the magnetic material is used to produce a certain magnetic field so as to trigger the switch-on and off of the Hall switch. Thus, the inductive source 703 can be the bankcard 700's own magnetic strip (i.e., a magnetic strip commonly found in an existing bank card). The inductive source 703 can also be a magnet or magnetic block additionally disposed in the bankcard 700, in which case the magnet or magnetic block can be attracted with the magnetic material in the smart terminal, thus causing the bankcard 700 to be attracted onto the smart terminal. The bankcard 700 can, of course, include both a magnetic strip and a magnetic block, with the magnetic strip serving as an inductive source to trigger the activation of RFID function of the smart terminal, and the magnetic block being, used to attract with the magnetic material in the smart terminal, enabling the bankcard 700 to be attracted onto the smart terminal.

In other embodiments, the bankcard 700 can further comprise an IC chip read-interface and a magnetic strip read-interface. If the terminal cannot implement RFID communication, then the above two read-interfaces can be used otherwise to read the bankcard 700.

Differing from the prior art, the bank card according to the current embodiment contains an RFID chip and an RFID antenna, wherein the information contained in the RFID chip can be used to communicate with the smart terminal via the RFID antenna so as to implement RFID communication. The bank card further comprises an inductive source, which can trigger the RFID function of the smart terminal to which the bank card is nearing to be activated, thus achieving read/write operation on the bank card with relatively low power consumption.

Figure 8:
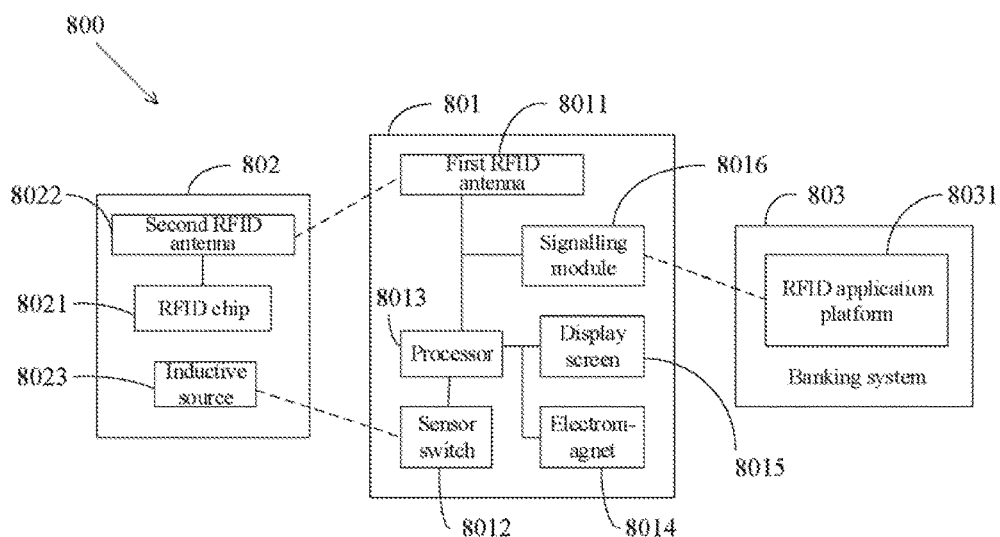
FIG. 8 is a block diagram illustrating a first embodiment of an RFID-based banking system according to the present disclosure.

Referring now to FIG. 8, there is shown a block diagram illustrating a first embodiment of an RFID-based banking system according to the present disclosure. This embodiment provides an RFID-based banking system 800, which comprises a smart terminal 801, a bank card 802, and a banking system 803.

The smart terminal 801 comprises a first RFID antenna 8011, a sensor switch 8012, a processor 8103, an electromagnet 8014, a display screen 8015, and a signaling module 8016. The structure and function of the smart terminal 801 are analogous to those of the smart terminal 300 in the second embodiment, and thus won't be went into details herein.

Bank card 802 comprises an RFID chip 8021, a second RFID antenna 8022 and an inductive source 8023. The structure and function of the bank card 802 are analogous to those of bankcard 700 in the first embodiment, and thus won't be went into details herein.

Banking system 803 can perform data storage and manipulations with a common bank card and with an MD bank card as well. An RFID application platform 8031 is provided in the banking system 803, and the RFID information and associated bank account information are stored in the RFID application platform 8031. By means of the RFID application platform 8031, the smart terminal 801 can bind the RFID information with the bank account information, where the information discussed can further be integrated dynamically with other portions of the banking system 803, thus enabling the banking system 803 to support both the RFID bank card and a common bank card concurrently.

Figure 9:
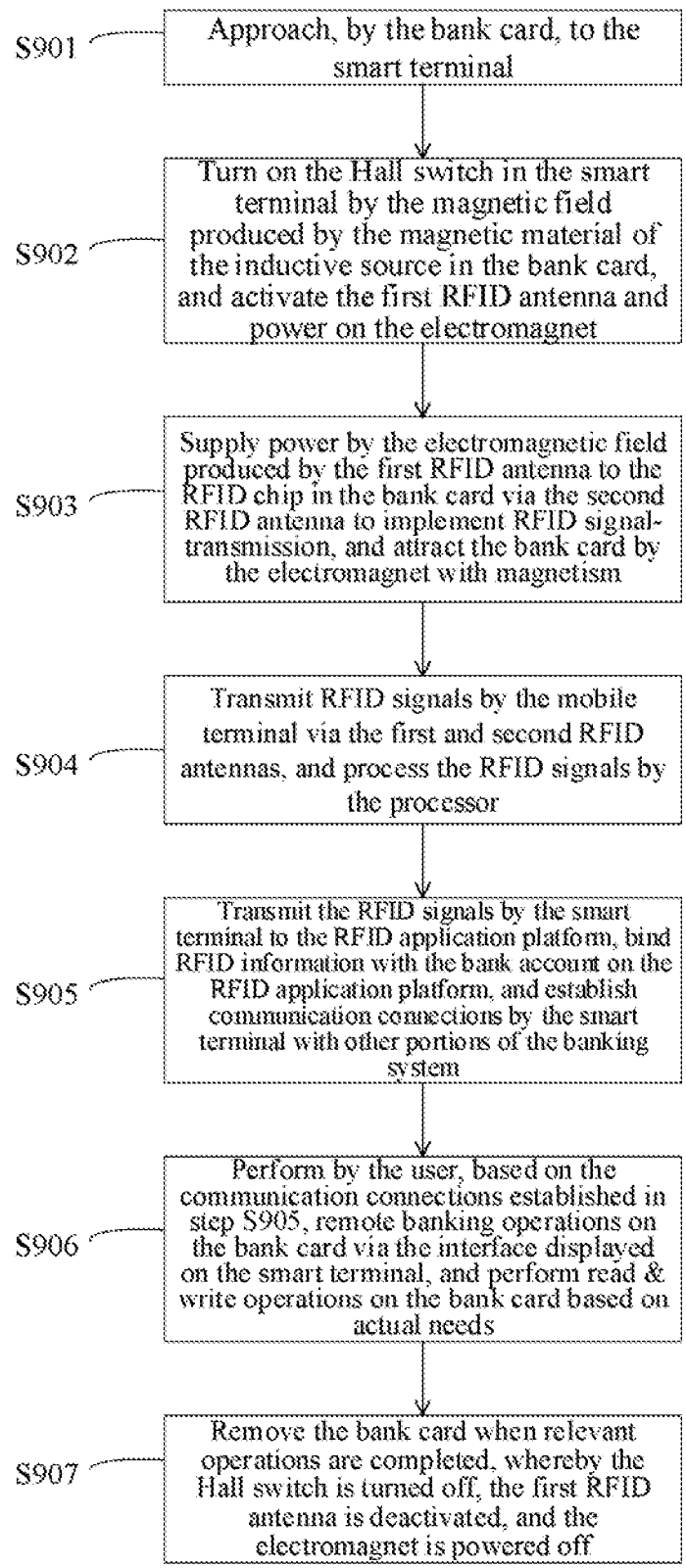
FIG. 9 is a flow chart illustrating the workflow of the first embodiment of the RFID-based financial management system according to the present disclosure.

Referring now to FIG. 9 for greater detail, there is shown a flow chart illustrating the workflow of the first embodiment of the RFID-based financial management system. The entire workflow comprises the following steps:

S901: Approach, by the bank card, to the smart terminal;

S902: Trigger the Hall switch in the smart terminal to be closed by the magnetic field produced by the magnetic material of the inductive source in the bank card, and activate concurrently the first RFID antenna and power on the electromagnet;

S903: Supply power, by the electromagnetic field produced by the first RFID antenna, to the RFID chip in the bank card via the second RFID antenna for implementing RFID signal transmission, and attract the bank card by the electromagnet which produces magnetism.

In this step, When the induction zone of the bank card coincides with the induction zone of the smart terminal to the largest extent, the communication effects would reach its optimum Therefore, the induction zone of the bank card is generally configured to be at its center. Similarly, the induction zone of the smart terminal may be configured to be over its back housing, and may approximately at the center of the back housing also.

S904 Transmit RFID signals by the smart terminal through the first and second RFID antennas, and process the RFID signals by the processor;

S905: Transmit the RFID signals by the smart terminal to the RFID application platform, bind the RFID information with the bank account by the RFID application platform, and establish by the smart terminal communication connections with other portions of the banking system;

S906: Manipulate by the user, based on the communication connections established in step S905, the interface displayed on the smart terminal to perform remote banking operations, and perform read/write operations on the bank card based on actual needs;

S907: Remove the bank card when operations are completed, whereby the Hall switch is turned off, the first RFID antenna is deactivated and the electromagnet is powered off.

Differing, from the prior art, the current embodiment effectuates management and manipulations on the RFID bank card relying on the smart terminal and the banking system. The smart terminal may activate its RFID function only when the bank card is nearing, and deactivate the RFID function including the RFID antenna when the bank card is not nearing, thus effectively reducing the power consumption and saving energy. In addition, the bank card is a multi-purpose card having an RFID chip, an IC read interface and a magnetic strip read interface. Furthermore, an RFID application platform is provided in the banking system and specially configured to effectuate communication with the RFID bank card, enabling the banking system to handle a common bank card and an RFID bank card as well. Namely, the financial management system according to the current embodiment can implement visualized remote banking operations on the RFID bank card.

What is described above is merely embodiments of the present disclosure, and thus shouldn't be construed to be limiting the patentable scope of the present disclosure. Any equivalent structures or equivalent process flow modifications that are made according to the specification and the attached drawings of the present disclosure, or any direct or indirect applications of the present disclosure in other related technical fields shall all be covered within the scope of the present disclosure.

What is claimed is:

1. An Radio Frequency Identification-based financial management system, comprising a smart terminal, a bank card and a banking system, wherein the smart terminal comprises a first RFID antenna, a sensor switch, a processor and a signaling module configured to interact with the banking system via network based on RFID signals; the bank card comprises a second RFID antenna, an RFID chip and an inductive source, the RFID chip comprising information of the bank card;

wherein when the bank card approaches the smart terminal, the sensor switch senses the inductive source and thus activates the first RFID antenna directly or through the processor so that the first RFID antenna to receive the RFID signals transmitted by the second RFID antenna to implement RFID function;

wherein the smart terminal comprises an electromagnet, and the sensor switch powers on the electromagnet directly or through the processor after the sensor switch senses the inductive source of the bank card, so that the electromagnet to produce a magnetic field sufficient to attract the bank card onto the smart terminal.

2. The RFID-based financial management system according to claim 1, wherein the inductive source is of magnetic material, and the sensor switch is a Hall switch;

wherein when the bank card approaches the smart terminal, the Hall switch senses a magnetic field produced by the magnetic material and is automatically closed and thus activates the first RFID antenna directly or through the processor, and further powers on the electromagnet directly or through the processor;

when the bank card moves away from the smart terminal, the Hall switch no longer senses the magnetic field produced by the magnetic material and is automatically opened and thus deactivates the first RFID antenna directly or through the processor, and further powers off the electromagnet directly or through the processor; wherein the magnetic field produced by the electromagnet is insufficient to influence the switch-on and switch-off of the Hall switch.

3. The RFID-based financial management system according to claim 2, wherein the inductive source is a magnetic strip configured to trigger the RFID function of the smart terminal to be activated or deactivated, and the bank card further comprises a magnetic block configured to be attracted to the smart terminal.

4. The RFID-based financial management system according to claim 1, wherein the first RFID antenna is attached to an interior of a housing of the smart terminal, and the second RFID antenna is arranged such that an induction zone to be produced by the second RFID antenna is at the center of the bank card.

5. The RFID-based financial management system according to claim 1, wherein the bank card further comprises an IC chip read-interface and a magnetic strip read-interface.

6. The RFID-based financial management system according to claim 1, wherein the sensor switch is an infrared sensor switch or an ultrasound sensing switch.

7. The RFID-based financial management system according to claim 1, wherein the smart terminal comprises at least one of a mobile phone, a tablet computer and a public inquiry machine.

8. An Radio Frequency Identification (RFID) based smart terminal, comprising a first RFID antenna, a sensor switch and a processor, wherein the first RFID antenna is configured to receive RFID signals, the sensor switch is configured to, when sensing the approach of a RFID signal source, activate the first RFID antenna directly or through the processor so as the first RFID antenna to implement RFID function;
wherein the RFID-based smart terminal comprises an electromagnet, and the sensor switch powers on the electromagnet directly or through the processor after the sensor switch senses the approach of the RFID signal source, so that the electromagnet to produce a magnetic field sufficient to attract a bank card onto the smart terminal.

9. The RFID-based smart terminal according to claim 8, wherein the sensor switch is a Hall switch, which is automatically closed when sensing a magnetic-field signal in order to activate the first RFID antenna directly or through the processor and further powers on the electromagnet directly or through the processor; and the magnetic field produced by the electromagnet is insufficient to influence the switch-on and switch-off of the Hall switch.

10. The RFID-based smart terminal according to claim 8, wherein the sensor switch is further configured to, when sensing the moving away of the RFID signal source, deactivate the first RFID antenna directly or through the processor and further powers off the electromagnet directly or through the processor.

11. The RFID-based smart terminal according to claim 8, further comprising a display screen and a signaling module, wherein the display screen is configured to, when the first RFID antenna is activated directly or through the processor, enable visualization of the RFID function via the display screen of the smart terminal, and the signaling module is configured to interact with a banking system via network based on the RFID signals.

12. The RFID-based smart terminal according to claim 8, wherein the sensor switch is an infrared sensor switch or an ultrasound sensing switch.

13. The RFID-based smart terminal according to claim 8, wherein the smart terminal comprises at least one of a mobile phone, a tablet computer and a public inquiry machine.

14. An Radio Frequency Identification (RFID) based bank card, comprising an RFID chip, a second RFID antenna and an inductive source, wherein the RFID chip comprises information of the bank card, the second RFID antenna is configured to transmit at least one portion of the information of the bank card, and the inductive source is configured to trigger RFID function of a smart terminal to which the bank card is approaching to be activated;
wherein the bank card further comprises a magnetic block, and the magnetic block is different from the inductive source and configured to be attracted to a smart terminal.

15. The RFID-based bank card according to claim 14, wherein the inductive source is a magnetic strip.

16. The RFID-based bank card according to claim 14, wherein the inductive source is further configured to trigger the RFID function of the smart terminal from which the bank card is moving away to be deactivated.

17. The RFID-based bank card according to claim 14, wherein the bank card further comprises an Integrated Circuit chip read-interface and a magnetic strip read-interface.

18. The RFID-based bank card according to claim 14, wherein the second RFID antenna is arranged as such that an induction zone produced by the second RFID antenna is at the center of the bank card.

19. The RFID-based bank card according to claim 14, wherein the inductive source is an infrared light source or an ultrasound wave source.

* * * * *